3,557,118
1,6-DIMETHYL-2,3-DIHYDRO-10α-ERGOLINE
DERIVATIVES
Federico Arcamone, Via Romolo Gessi N. 50, and Giovanni Franceschi, Via Etiopia N. 3, both of Milan, Italy
No Drawing. Filed July 25, 1967, Ser. No. 655,755
Claims priority, application Italy, July 29, 1966, 20,851
Int. Cl. C07d 43/20
U.S. Cl. 260—285.5
10 Claims

ABSTRACT OF THE DISCLOSURE

Described are hydrogenated ergoline derivatives of the formula:

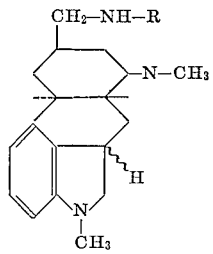

wherein R is selected from the group consisting of hydrogen and a radical of an organic aliphatic, cycloaliphatic and heterocyclic carboxylic or sulfonic acid having from 1 to 10 carbon atoms, substituted or not by halogen, hydroxy, nitro, amino or alkylamino groups; alkyl, aryl, alkoxy, aryloxy, thioether or sulfonic groups of an alkyl or arylcarbonic and dialkylcarbamic acid and the process for the preparation thereof.

---

The present invention relates to new 1,6-dimethyl-10α-ergoline derivatives useful in therapy and to a process for the preparation thereof.

More particularly, the present invention has as its object, hydrogenated ergoline derivatives of the formula:

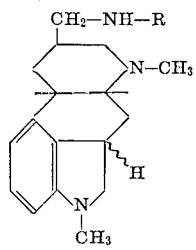

wherein R is selected from the group consisting of hydrogen and a radical of an organic aliphatic, cycloaliphatic and heterocyclic carboxylic or sulfonic acid having from 1 to 10 carbon atoms, substituted or not by halogen, hydroxy, nitro, amino or alkylamino groups; alkyl, aryl, alkoxy, aryloxy, thioether or sulfonic groups of an alkyl or arylcarbonic and dialkylcarbamic acid and the process for the preparation thereof.

Known in the literature (British Pat. No. 959,261 and U.S. Pat. No. 3,238,211) are 8β-N-acylaminomethyl derivatives of the 1,6-dimethyl-10α-ergoline having antienteraminic, oxytocic, adrenolytic, hypotensive and sedative activity. Applicants surprisingly found that the compounds of the present invention show a high antienteraminic, oxytocic, adrenolytic, hypotensive and sedative activity combined with a more favorable assimilation than the corresponding compounds non-hydrogenated in 2,3-position. The products of the invention therefore show a remarkable therapeutical advantage in comparison to those known in that their action is more rapid and then they may be used in lower doses.

The compounds of our invention may be prepared by a process consisting in reducing 1,6-dimethyl-8β-aminomethyl-10α-ergoline (see U.S. Pat. No. 3,238,211 or British Pat. No. 959,261) and acylating the 1,6-dimethyl-8β-aminomethyl-2,3-dihydro-10α-ergoline thus obtained. The reduction of 1,6-dimethyl-8β-amino-methyl-10α-ergoline is preferably carried out according to the method described by Smith A. et al. (Chem. Communications, London (1965), No. 18, p. 427). This method, which according to the invention is applied for the first time with success to ergoline derivatives, consists in treating the starting material with a solution of fluoboric acid or other strong acids in a polar solvent such as an alcohol, water or mixtures thereof, for example ethanol, in the presence of a catalyst, such as platinum oxide, at room temperature and under atmospheric pressure. The 1,6-dimethyl - 8β - aminomethyl-2,3-dihydro-10α-ergoline, thus obtained, can be isolated from the reaction mixture by making alkaline and extracting with an organic suitable solvent. The corresponding N-acyl derivatives are prepared by reacting 1,6-dimethyl-8β-aminomethyl-2,3-dihydro-10α-ergoline with an acylating agent, such as the anhydride or chloride of a suitable acid, as above defined, in the optional presence of a tertiary amine, such as pyridine, diethylamine and triethylamine.

Typical examples of acyl derivatives, prepared according to the process of the invention are the derivatives of the following acids: acetic, trimethylacetic, propionic, butyric, valerianic, hexanoic, heptanoic, octanoic, decanoic, cyclopentanecarboxylic, cyclopentylpropionic, succinic, benzoic, 2-nitro-benzoic, 3-chloro-benzoic, salacylic, methylbenzoic, 2-methoxy-benzoic, methylthio-salicylic, 2,6-dimethoxy-benzoic, 3,4,5-trimethoxy-benzoic, phenylpropionic, phenoxy-acetic, α-phenoxypropionic, diethylcarbamic, chloroacetic, N,N-diethyl-amino-acetic, α-phenoxy-butyric, butylcarbonic, isobutylcarbonic, ethylcarbonic, propylcarbonic, isopropylcarbonic, benzylcarbonic, N-ethyl-anthranilic, N,N-dimethyl-anthranilic, p-toluene-sulfonic, methanesulfonic, pyrrole-2-carboxylic, N-pyrrolidino-acetic, nicotinic, isonicotinic, pyridine-3,5-dicarboxylic, pyridine-3-sulfonic, lutidinic, pyridine-3-acetic, picolinic, pyridine-3-isobutyric, piperidine-2-carboxylic, 3-ethyl-piperidine-4-acetic, indole-3-acetic, imidazole-4-acetic, pyrazinic, piperazine-1-acetic, piperazine-2-dimethylaminoethyl-1-carboxylic, pyrimidine-4-carboxylic, pyrimidine - 5 - bromo-2-carboxylic, pyrimidine-5-amino-2-methyl-4-carboxylic, furan-3-methyl-2-carboxylic furan-2-carboxylic, pyran-2,6-dicarboxylic, thiophen-3-carboxylic, thiophen-2,4-disulfonic, isooxazole-3-carboxylic, isooxazole-5-amino-3-methyl-4-carboxylic, N-morpholino-acetic, thiomorpholine-3,5-dicarboxylic, thiazole-2-carboxylic, thiazole-4-methyl-2-carboxylic, thiazole-2-amino-4-carboxylic, thiazole-2-hydroxy-4-carboxylic and thiazole-2-acetic.

The compounds of the invention are particularly useful as anticephalalgic, antiallergic and antiinflammatory drugs. They may be administered either by the oral, rectal or parenteral route, finding particularly employment in the following clinical conditions: migraine, cephalalgy, trigeminal neuralgia, allergy in general and inflammatory states.

The therapeutic compositions as usually employed include 1-methyl-N-carbobenzoxy-dihydro-lysergamine or one of its salts with a certain amount of solid or liquid vehicle. The therapeutic compositions can be prepared as tablets, powders, pills, elixir or other forms, pharmaceutically suitable for oral administration. Liquid diluents, duly sterilized, may be employed for the parenteral administration. Some excipients may be employed, among which the most suitable are: starch, lactose, talc, magnesium stearate or other excipients usually employed in pharmacy. Tablets may be also prepared with substances normally employed for pharmaceutical use, or capsules and containers normally used, such as gelatin capsules.

The biological activity of 1,6-dimethyl-8β-N-carbobenzoxyaminomethyl - 2,3-dihydro - 10α-ergoline is shown to be as antagonistic to the serotonine action and it has been tested both "in vitro" and "in vivo" and compared with that of 1-methyl - N-carbobenzoxy-dihydro-lysergamine. The antiserotonine activity has been determined "in vitro" according to the method described by Stone et al. (J. Pharm. Exp. Ther. 131, p. 73 (1961)), which is based on the inhibition of the contracting action of serotonine on the rat uterus.

The following Table 1 gives the results obtained of $EC_{50}$, that is the concentration (in $\gamma/cm.^3$), able to produce the inhibition of 50% of spasmogen effects caused by serotonine.

TABLE 1

Serotonine (0.01 $\gamma/cm.^3$):
    1,6-dimethyl - 8β-N-carbobenzoxyamino-
    methyl - 2,3 - dihydro - 10α - ergoline,
    $EC_{50}$ ($\gamma/cm.^3$) ------------------ 0.000001
    1 - methyl - N - carbobenzoxy - dihydro-
    lysergamine, $EC_{50}$ ($\gamma/cm.^3$) -------- 0.0000007

In vivo, the antiserotonine actiivty was checked by the method described by W. Doepfner and A. Cerletti (Int. Arch. Allergy 12, pp. 89–97 (1958)), which is based upon the inhibition of 50% of edema caused by serotonine on a rat's paw. Table 2 lists the results obtained of $ED_{50}$, that is the dose (in mg./kv.) able to produce the 50% of inhibition of the effects caused by serotonine in the animals treated with gradual doses of the products under examination and at different periods of time from the administration of the antagonist to the administration of agonist, serotonine.

TABLE 2

| Time from the administration of the antagonist to that of serotonine | 1,6-dimethyl-8β-N-carbobenzoxyamino-methyl-2,3-dihydro-10α ergoline $ED_{50}$ (mg./kg.) | | 1-methyl-N-carbobenzoxy-dihydro-lysergamine $ED_{50}$ (mg./kg.) | |
|---|---|---|---|---|
| | Subcutaneously | Orally | Subcutaneously | Orally |
| Hours: | | | | |
| 0.5 | | 0.300 | 0.083 | 0.380 |
| 1 | 0.025 | 0.055 | 0.052 | 0.165 |
| 2 | | 0.100 | 0.038 | |
| 3 | 0.023 | 0.080 | 0.015 | 0.075 |
| 4 | | | 0.025 | |
| 5 | | | 0.026 | |
| 6 | | 0.220 | 0.033 | 0.150 |
| 7 | | | 0.039 | |

The toxicity of 1,6-dimethyl-8β-N-carbobenzoxyaminomethyl - 2,3-dihydro - 10α- ergoline was checked according to tests usually performed with drugs derived from lysergic acid.

The following results were obtained:

| Animals | $DL_{50}$, mg./kg. | Administration route and solvent used |
|---|---|---|
| Rabbit | 15–25 | Intravenously, 1.5% ascorbic acid. |
| Mouse | 28 | Do. |
| Do | 170 | Intraperitoneally, arabic gum. |
| Do | 70 | Intraperitoneally, ascorbic acid-ethano. |

The following examples serve to illustrate, but not to limit, the invention.

EXAMPLE 1

1,6-dimethyl-8β-aminomethyl-2,3-dihydro-10α-ergoline

To a solution of 2 g. of 1,6-dimethyl-8β-aminomethyl-10α-ergoline in 15 cc. of ethanol and 20 cc. of 31% fluoboric acid, 110 mg. of platinum oxide (Adams catalyst) were added. The mixture was hydrogenated under atmospheric pressure and at room temperature. The reduction was checked from time to time by examining the ultraviolet spectrum of a solution obtained by diluting with methanol an aliquot part of the reaction mixture. It was considered to be complete when such spectrum showed the typical characteristics of the 2,3-dihydro-indole derivatives. The mixture was made alkaline with aqueous sodium carbonate and 1,6-dimethyl - 8β-aminomethyl-2,3-dihydro - 10α-ergoline obtained was extracted with methylene chloride. By recrystallization from methanol-ether, 600 mg. of the product were obtained, melting at 134–136° C. (U.V. maxima at 252 and 292 m$\mu$).

EXAMPLE 2

1,6-dimethyl-8β-N-carbobenzoxyaminomethyl-2,3-dihydro-10α-ergoline 600 mg. of 1,6-dimethyl - 8β-aminomethyl-2,3-dihydro-10α-ergoline were suspended in a mixture of pyridine (0.6 cc.) and chloroform (3 cc.) and treated with a solution of 0.65 cc. of benzyl chloroformate in 5 cc. of chloroform, added drop by drop, at a temperature of from $-10°$ to 0° C. The mixture was then kept for one hour at room temperature and thereinafter extracted with an aqueous sodium bicarbonate solution and then with water. The organic phase was evaporated off, the residue was taken up with ethyl ether and 1,6-dimethyl - 8β-N-carbobenzoxyaminomethyl - 2,3-dihydro - 10α-ergoline was recovered. By recrystallization from acetone ether, 500 mg. of the product were obtained, melting at 161–163° C.; $[\alpha]_D = -54°$ (c.=0.25 pyridine); (U.V. maxima at 252 and 292 m$\mu$).

EXAMPLE 3

1,6-dimethyl-8β-acetamidomethyl-2,3-dihydro-10α-ergoline 500 mg. of 1,6-dimethyl-8β-aminoethyl-2,3-dihydro-10α-ergoline were dissolved in 11 cc. of pyridine and treated with 0.25 cc. of acetyl chloride, added drop by drop, at the temperature of 15° C. It was then allowed to stand for 30 minutes at this temperature and was stirred for one hour at room temperature. The precipitate initially obtained disappeared. The whole was poured into a mixture of 60 cc. of chloroform, 10 cc. of methanol and 10 cc. of 1 N sodium hydroxide. The organic phase, thoroughly washed with water, was evaporated and the residue was recrystallized from acetone. 300 mg. of the product were obtained, melting at 223–226° C.; $[\alpha]_D = -79.2°$ (c.=0.25 pyridine); (U.V. maxima at 252 and 293 m$\mu$).

EXAMPLE 4

1,6-dimethyl-8β-cyclopentylpropionamidomethyl-2,3-dihydro-10α-ergoline 500 mg. of 1,6-dimethyl-8β-aminomethyl-2,3-dihydro-10α-ergoline dissolved in 11 cc. of pyridine were treated with 550 mg. of β-cyclopentylpropionyl chloride, added drop by drop, at 0° C. The mixture was stirred for 30 minutes at 0° C. and for one hour at room temperature. The solution was then poured into a mixture of 65 cc. of chloroform, 10 cm.³ of methanol and 10 cm.³ of 1 N sodium hydroxide. The organic phase, washed with water, was evaporated off and the residue was recrystallized from acetone. 400 mg. of the product were obtained melting at 203–205° C.; [α]$_D$=−60.3° (c.=0.22 pyridine); (U.V. maxima at 252 and 293 mμ).

EXAMPLE 5

1,6-dimethyl-8β-benzamidomethyl-2,3-dihydro-10α-ergoline 500 mg. of 1,6-dimethyl-8β-aminomethyl-2,3-dihydro-10α-ergoline were dissolved in 11 cc. of pyridine and treated with 0.35 cc. of benzoyl chloride, added drop by drop, at a temperature from −15° to −10° C. The mixture was stirred to stand for 30 minutes at this temperature and then for one hour at room temperature. The solution was poured into a mixture of 60 cc. of chloroform, 10 cc. of methanol and 10 cc. of 1 N sodium hydroxide. The organic phase was separated, washed with water and then evaporated. The residue was recrystallized from acetone and 350 mg. of the product were obtained, melting at 239–241° C.; [α]$_D$=−75.2° (c.=0.25 pyridine); (U.V. maximum at 294 mμ).

EXAMPLE 6

1,6-dimethyl-8β-nicotinamidomethyl-2,3-dihydro-10α-ergoline 500 mg. of 1,6-dimethyl-8β-aminomethyl-2,3-dihydro-10α-ergoline dissolved in 20 cc. of pyridine were mixed little by little with 800 mg. of nicotinoyl chloride over 30 minutes at room temperature with stirring. The precipitate initially obtained disappears when about the half of the reagent has been added. It was kept for one hour at room temperature and the solution was poured into a mixture of 140 cc. of chloroform, 20 cc. of methanol and 30 cc. of 1 N sodium hydroxide. The organic phase, washed with water, was evaporated off and the residue was recrystallized from acetone. 300 mg. of the product were obtained melting at 230–232° C.; [α]$_D$=−60° (c.=0.21 pyridine); (U.V. maxima at 253 and 294 mμ).

By the same procedure other products having the above general formula may be prepared, among which the most representative are:

1,6-dimethyl-8β-carbethoxyaminomethyl - 2,3 - dihydro-10α-ergoline,
1,6-dimethyl-8β-propionamidomethyl - 2,3 - dihydro-10α-ergoline,
1,6-dimethyl-8β-phenylacetamidomethyl-2,3-dihydro - 10α-ergoline.

We claim:
1. A compound of the formula:

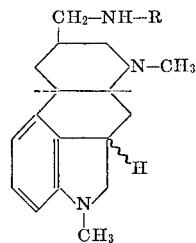

wherein R is selected from the group consisting of hydrogen, an acyl group of a substituted or unsubstituted saturated aliphatic acid of from 1 to 4 carbon atoms, the substituent being selected from the group consisting of chloro, diethylamino, phenoxy and phenyl,
an acyl group of an alkyl- or benzylcarbonic acid in which the alkyl group has from 1 to 4 carbon atoms,
an acyl group of a saturated cycloaliphatic acid of not more than 8 carbon atoms, wherein the cycloaliphatic ring is of 5 carbon atoms,
an acyl group of an aromatic acid selected from the group consisting of substituted and unsubstituted benzoic acid in which the substituent is selected from the group consisting of chloro and methoxy, and
an acyl group selected from nicotinic and isonicotinic acid.

2. The compound of claim 1, which is 1,6-dimethyl-8β-aminomethyl-2,3-dihydro-10α-ergoline.
3. The compound of claim 1, which is 1,6-dimethyl-8β-N-carbobenzoxyaminomethyl-2,3-dihydro-10α-ergoline.
4. The compound of claim 1, which is 1,6-dimethyl-8β-carbethoxyaminomethyl-2,3-dihydro-10α-ergoline.
5. The compound of claim 1, which is 1,6-dimethyl-8α-acetamidomethyl-2,3-dihydro-10α-ergoline.
6. The compound of claim 1, which is 1,6-dimethyl-8β-propionamidomethyl-2,3-dihydro-10α-ergoline.
7. The compound of claim 2, which is 1,6-dimethyl-8β-cyclopentylpropionamidomethyl-2,3-dihydro-10α-ergoline.
8. The compound of claim 1, which is 1,6-dimethyl-8β-benzamidomethyl-2,3-dihydro-10α-ergoline.
9. The compound of claim 1, which is 1,6-dimethyl-8β-phenylacetamidomethyl-2,3-dihydro-10α-ergoline.
10. The compound of claim 1, which is 1,6-dimethyl-8β-nicotinamidomethyl-2,3-dihydro-10α-ergoline.

References Cited

UNITED STATES PATENTS 3,228,944   1/1966   Bernardi et al. _____ 260—285.5

DONALD G. DAUS, Primary Examiner

U.S. Cl. X.R.

260—241, 251, 268; 424—261